US010413077B2

(12) United States Patent
Freelend (10) Patent No.: US 10,413,077 B2
(45) Date of Patent: Sep. 17, 2019

(54) ANTI-WOBBLE ADJUSTABLE BED LEG ASSEMBLY

(71) Applicant: L&P Property Management Company, South Gate, CA (US)

(72) Inventor: Isaac T. Freelend, Reeds, MO (US)

(73) Assignee: L&P Property Management Company, South Gate, CA (US)

( * ) Notice: Subject to any disclaimer, the term of this patent is extended or adjusted under 35 U.S.C. 154(b) by 208 days.

(21) Appl. No.: 15/803,094

(22) Filed: Nov. 3, 2017

(65) Prior Publication Data

US 2019/0137030 A1    May 9, 2019

(51) Int. Cl.
| | |
|---|---|
| *A47C 19/02* | (2006.01) |
| *A47C 19/04* | (2006.01) |
| *A47B 9/14* | (2006.01) |
| *A47B 91/02* | (2006.01) |
| *F16B 7/10* | (2006.01) |
| *F16B 7/18* | (2006.01) |
| *F16M 7/00* | (2006.01) |
| *F16M 11/26* | (2006.01) |

(52) U.S. Cl.
CPC .............. *A47C 19/024* (2013.01); *A47B 9/14* (2013.01); *A47B 91/024* (2013.01); *A47C 19/04* (2013.01); *A47C 19/045* (2013.01); *F16B 7/105* (2013.01); *F16B 7/182* (2013.01); *F16M 7/00* (2013.01); *F16M 11/26* (2013.01); *F16M 2200/08* (2013.01)

(58) Field of Classification Search
CPC ....... A47B 91/024; A47B 9/14; A47C 19/045; A47C 19/024; F16B 7/105; F16B 7/182; F16M 11/26; F16M 7/00; F16M 2200/08
USPC ................................ 248/188.2, 188.5, 188.8
See application file for complete search history.

(56) References Cited

U.S. PATENT DOCUMENTS

| | | | | |
|---|---|---|---|---|
| 3,164,351 A | * | 1/1965 | Rembowski | A47B 9/14 248/188.5 |
| 3,306,639 A | * | 2/1967 | Lyon | B25G 1/043 403/107 |
| 3,347,575 A | * | 10/1967 | Morris | F16B 7/105 403/107 |

(Continued)

FOREIGN PATENT DOCUMENTS

| | | | | |
|---|---|---|---|---|
| DE | 928979 C | * | 6/1955 | .............. F16B 7/105 |
| EP | 1371306 A2 | * | 12/2003 | .............. A47B 9/20 |

(Continued)

*Primary Examiner* — Eret C McNichols
(74) *Attorney, Agent, or Firm* — Wood Herron & Evans LLP (57) ABSTRACT

An adjustable leg assembly for use in a bedding product, such as an adjustable bed, may be stabilized by rotating the leg of the leg assembly. To change the length of the leg assembly, a leg must be rotated in the opposite direction to loosen a slotted collar located inside a receiver welded to a frame of the adjustable bed. A wedge is fixed inside the receiver with a push pin assembly above the slotted collar. A threaded member of the leg extends through the wedge. Rotation of the leg moves the leg slightly upwardly relative to the stationary wedge, causing an upper portion of the slotted collar to expand over a portion of the stationary wedge until the slotted collar contacts an inside surface of the receiver and stabilizes the leg assembly.

20 Claims, 6 Drawing Sheets

(56) References Cited

U.S. PATENT DOCUMENTS

| | | | | | |
|---|---|---|---|---|---|
| 3,864,048 | A | * | 2/1975 | Parker | F16B 7/105 403/27 |
| 4,079,978 | A | * | 3/1978 | McMullin | F16B 7/105 15/3.51 |
| 5,095,560 | A | * | 3/1992 | Volker | A61G 7/012 5/11 |
| 5,203,039 | A | * | 4/1993 | Fredman | A47C 19/024 248/188.4 |
| 5,894,614 | A | * | 4/1999 | Stroud | A47B 91/028 5/200.1 |
| 5,996,145 | A | * | 12/1999 | Taylor | A47C 19/005 5/184 |
| 6,006,379 | A | * | 12/1999 | Hensley | A47C 20/041 5/616 |
| 6,092,771 | A | * | 7/2000 | Fich | A47B 9/06 248/188.5 |
| 6,629,506 | B2 | * | 10/2003 | Park | A47B 9/18 108/156 |
| 6,902,140 | B1 | * | 6/2005 | Huang | E06C 7/44 248/188.2 |
| 6,920,834 | B1 | * | 7/2005 | Pehta | A47B 9/14 108/147.21 |
| 7,159,829 | B1 | * | 1/2007 | Finkelstein | B60B 33/04 108/144.11 |
| 7,712,478 | B2 | * | 5/2010 | Gibbons | A61H 3/02 135/66 |
| 8,926,214 | B2 | * | 1/2015 | Lah | A45B 9/00 135/75 |
| 9,451,833 | B2 | * | 9/2016 | Rawls-Meehan | A61G 7/015 |
| 10,051,970 | B1 | * | 8/2018 | Kramer | A47C 20/08 |
| 2001/0024594 | A1 | * | 9/2001 | Taylor | B25G 1/04 403/109.7 |
| 2003/0215283 | A1 | * | 11/2003 | Hsieh | F16B 7/105 403/109.2 |
| 2006/0195982 | A1 | * | 9/2006 | Cloer | A47C 19/024 5/202 |
| 2015/0285430 | A1 | * | 10/2015 | Wang | A47B 9/04 248/188.5 |
| 2017/0224112 | A1 | * | 8/2017 | Devereux | F16M 7/00 |

FOREIGN PATENT DOCUMENTS

| | | | | |
|---|---|---|---|---|
| FR | 2720128 | A1 | * 11/1995 | A47B 9/14 |
| GB | 819887 | A | * 9/1959 | F16B 7/182 |

* cited by examiner

ANTI-WOBBLE ADJUSTABLE BED LEG ASSEMBLY

FIELD OF THE INVENTION

This invention relates generally to bedding products and, more particularly, to a stable leg assembly for an adjustable bed regardless of its length.

BACKGROUND OF THE INVENTION

Adjustable beds are often in motion moving from one position to another. This movement puts a great deal of stress on the legs of an adjustable bed. Over time, such stress may damage one or more of the legs on an adjustable bed.

Prior to the present invention, leg assemblies having adjustable heights were used on adjustable bed frames. However, such a leg assembly comprised only two pieces, basically a tube within a tube. When the height of the leg assemblies got too high, the adjustable bed got wobbly or unstable. The same is true for leg assemblies used in other bedding products, including stationary bed frames.

Therefore, there is a need for a stable leg assembly having an adjustable height for use with an adjustable bed or other bedding product, such as a bed frame.

There is further a need for rigid leg assemblies which have adjustable heights for use on adjustable bed frames.

There is further a need for leg assemblies having adjustable heights for use on adjustable bed frames which are rigid, regardless of their selected heights.

SUMMARY OF THE INVENTION

According to one aspect of the invention, a leg assembly for use in a bedding product, such as an adjustable bed or bed frame, may be adjusted to any desired length without compromising its stability. The leg assembly comprises a receiver secured to a frame which may be part of an adjustable bed or other bedding product. The receiver is tubular and has multiple holes through its wall. The leg assembly further comprises a leg having a threaded member extending outwardly from one end of the leg. A slotted collar having the same outer diameter as the leg is supported by the leg above the leg. The leg assembly further comprises a wedge having a lower portion, including a bottom with a threaded hole and an upper portion with an opening. The lower portion of the wedge has a tapered outer diameter. A push pin assembly is located inside the upper portion of the wedge. The push pin assembly includes a push pin extending through the opening in the upper portion of the wedge and through one of the holes in the receiver to fix the location of the wedge relative to the receiver. The threaded member of the leg extends through the threaded hole in the bottom of the wedge. Upon rotation of the leg, the threaded member of the leg causes an upper edge of the leg to push the slotted collar upwardly over the bottom of the wedge, causing the slotted collar to expand outwardly against an inside surface of the receiver to stabilize the leg assembly.

In a second aspect, the leg assembly for use in a bedding product comprises a receiver secured to a frame of the bedding product. The receiver has aligned holes for receiving push pins for fixing the length of the leg. The leg assembly further comprises a leg having a threaded member extending outwardly from one end of the leg. Another component of the leg assembly is a wedge having a lower portion, including a bottom with a threaded hole and an upper portion with an opening. The lower portion of the wedge has a tapered outer diameter. The threaded member of the leg extends through the threaded hole in the bottom of the wedge. A push pin assembly is inside the upper portion of the wedge. The push pin assembly extends through the opening in the upper portion of the wedge and through one of the holes in the receiver to fix the location of the wedge relative to the receiver. The leg assembly further comprises a slotted collar sandwiched between the leg and the wedge. Upon rotation of the leg, the leg moves upwardly relative to the wedge fixed in a desired position, an upper edge of the leg pushing the slotted collar upwardly over the bottom of the wedge, causing the slotted collar to expand outwardly against an inside surface of the receiver to stabilize the leg assembly.

In a third aspect, a leg assembly for use in an adjustable bed comprises a receiver welded to a frame of the adjustable bed. The receiver has a hollow interior and aligned holes extending through a wall of the receiver. A leg is adapted to move between positions inside the hollow interior of the receiver to change the height of the adjustable bed. The leg has a threaded member at one end and an end cap at the other end. A rubber foot may cover the end cap and end of the leg. The leg assembly further comprises a wedge having a bottom with a threaded hole adapted to receive the threaded member of the leg, an upper portion with an opening and a lower portion having a non-uniform outer diameter. The threaded member of the leg extends through the threaded hole in the bottom of the wedge. A push pin assembly inside the upper portion of the wedge extends through the opening in the upper portion of the wedge and through one of the holes of the receiver to fix the location of the wedge relative to the receiver. A slotted collar is sandwiched between the leg and the wedge. The slotted collar has a lower edge contacting an upper edge of the leg. A portion of the slotted collar fits around the lower portion of the wedge and is expandable to contact an inside surface of the receiver to stabilize the leg assembly upon upwardly movement of the leg relative to the stationary wedge due to rotation of the leg.

The accompanying drawings, which are incorporated in and constitute a part of this specification, illustrate embodiments of the invention and, together with the summary of the invention given above, and the detailed description of the drawings given below, explain the principles of the present invention.

DETAILED DESCRIPTION OF THE INVENTION

Figure 1:
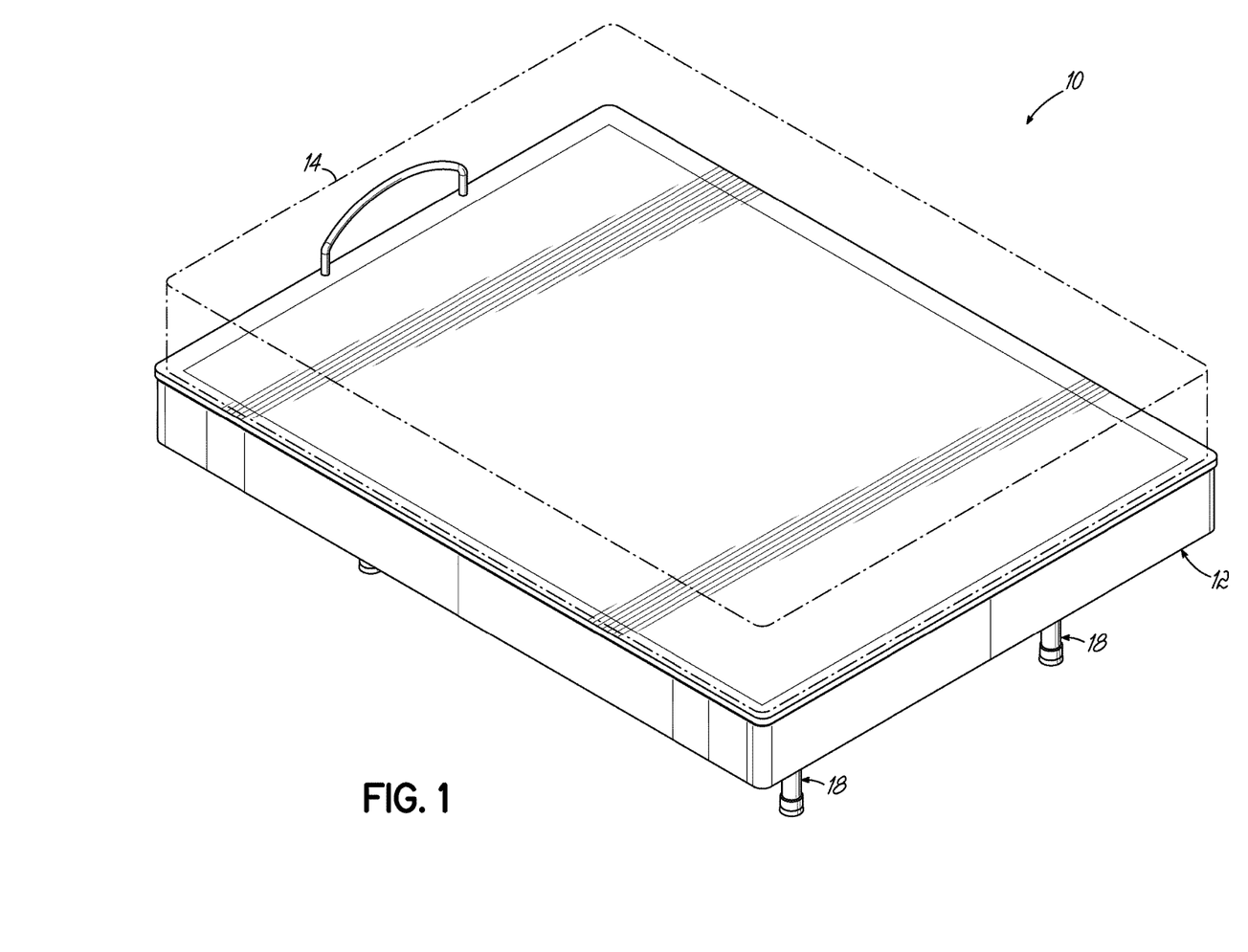
FIG. 1 is a top perspective view of a base of an adjustable bed.
Figure 2:
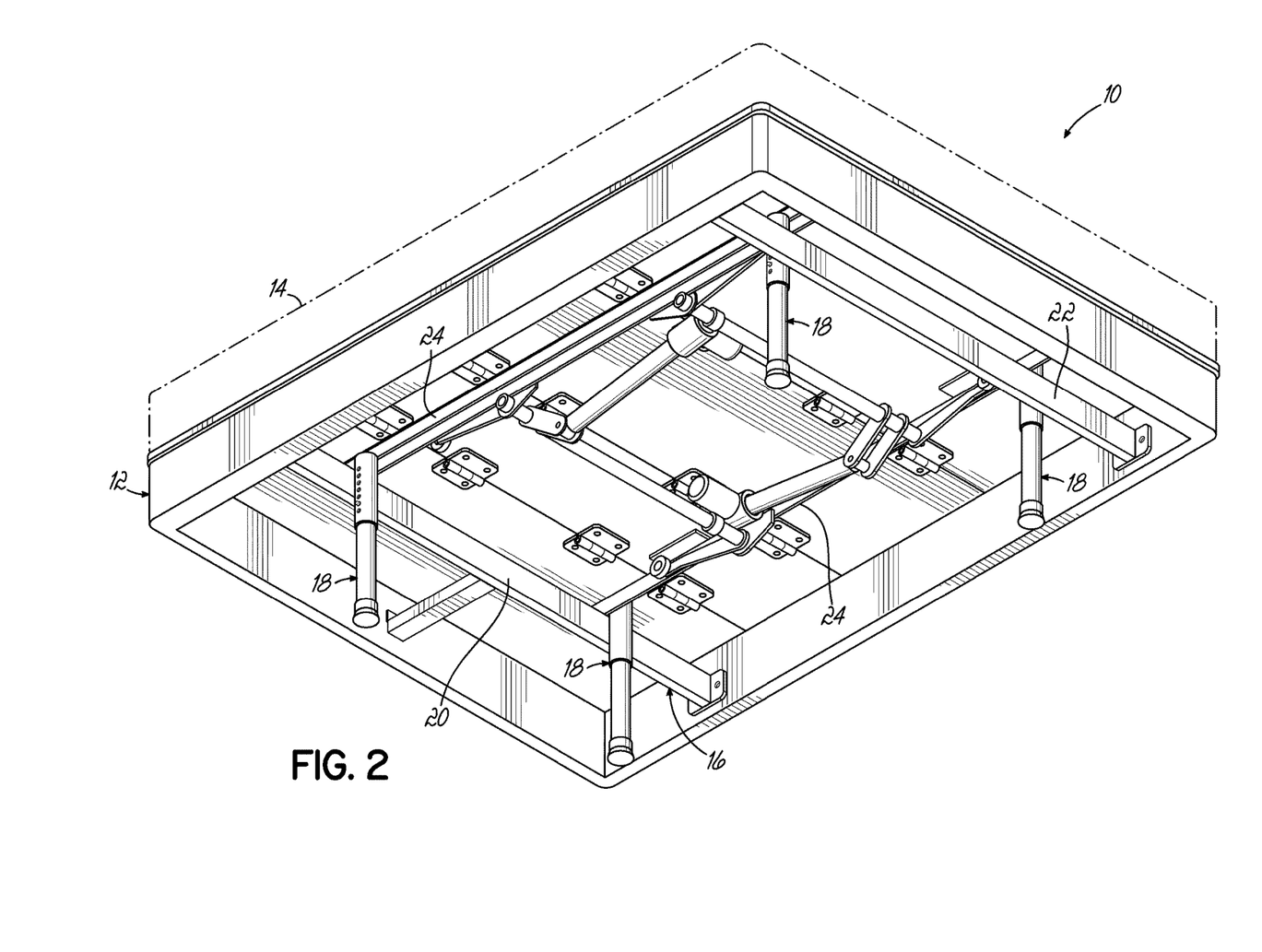
FIG. 2 is a bottom perspective view of the adjustable bed base of FIG. 1 showing a frame supported by four leg assemblies.

Referring first to FIG. 1, there is illustrated an adjustable bed 10, including an adjustable bed base 12 supporting a mattress 14. As best shown in FIG. 2, the adjustable bed base 12 comprises a generally rectangular metal frame 16 supported by four leg assemblies 18. Although one type of generally rectangular metal frame 16 is illustrated being part of the adjustable bed base 12, any other type of generally rectangular frame may be supported by any number of leg assemblies constructed in accordance with the present invention. The leg assembly of the present invention may be used in any type of adjustable bed base. The adjustable bed base is not intended to be limited by the drawings.

As best shown in FIG. 2, the generally rectangular metal frame 16 comprises a head member 22, a foot member 20 and two side members 24, each side member 24 extending between the head and foot members 22, 20, respectively. As best shown in FIG. 2, each leg assembly 18 is illustrated being secured to one of the side members 24 and one of the head and foot members 22, 20, respectively, of the generally rectangular metal frame 16. Such securement is typically accomplished via welding, but any known method may be used to secure the receivers 26, as described below to one or more pieces of the generally rectangular metal frame 16. The location of the leg assemblies is not intended to be limited by the drawings; each leg assembly may be secured to only one of the head and foot members 22, 20 or only one of the side members 24 of the generally rectangular metal frame 16.

Figure 3:
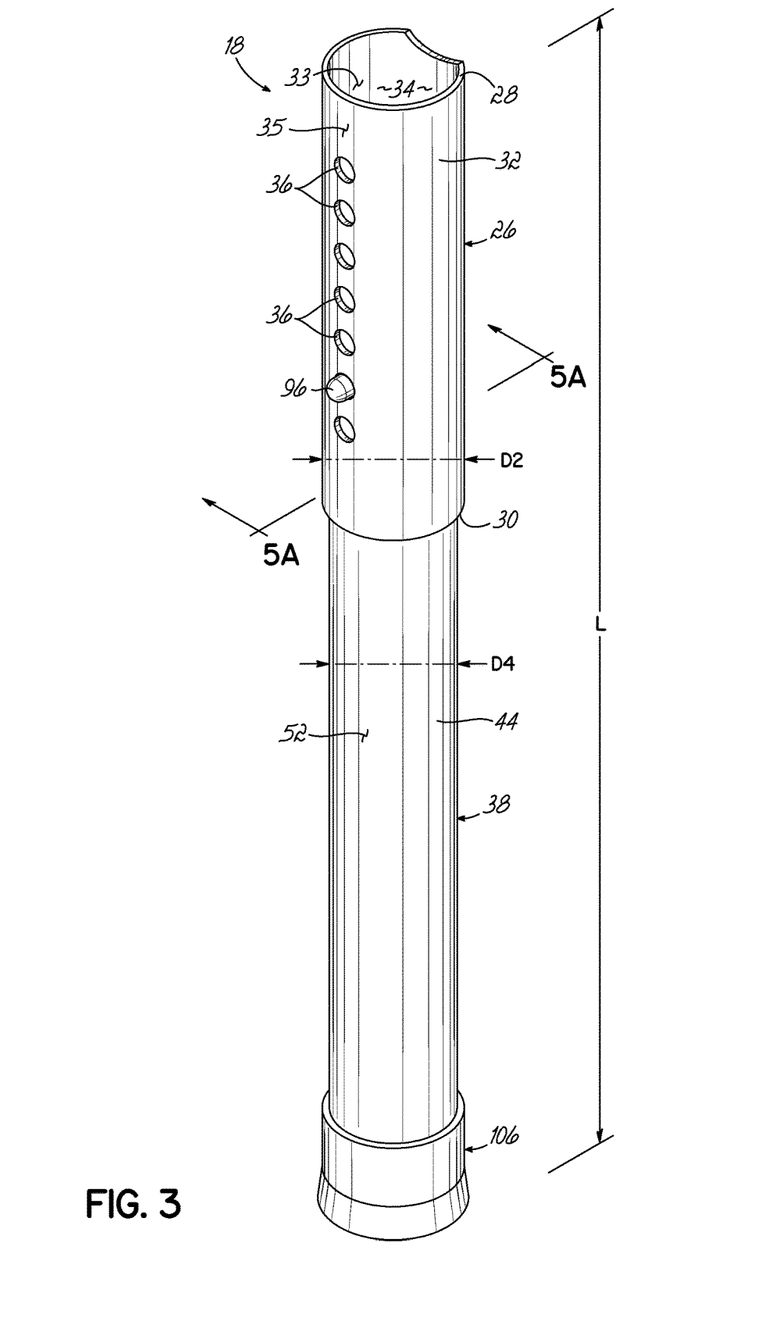
FIG. 3 is a perspective view of one of the leg assemblies of FIG. 2.
Figure 4:
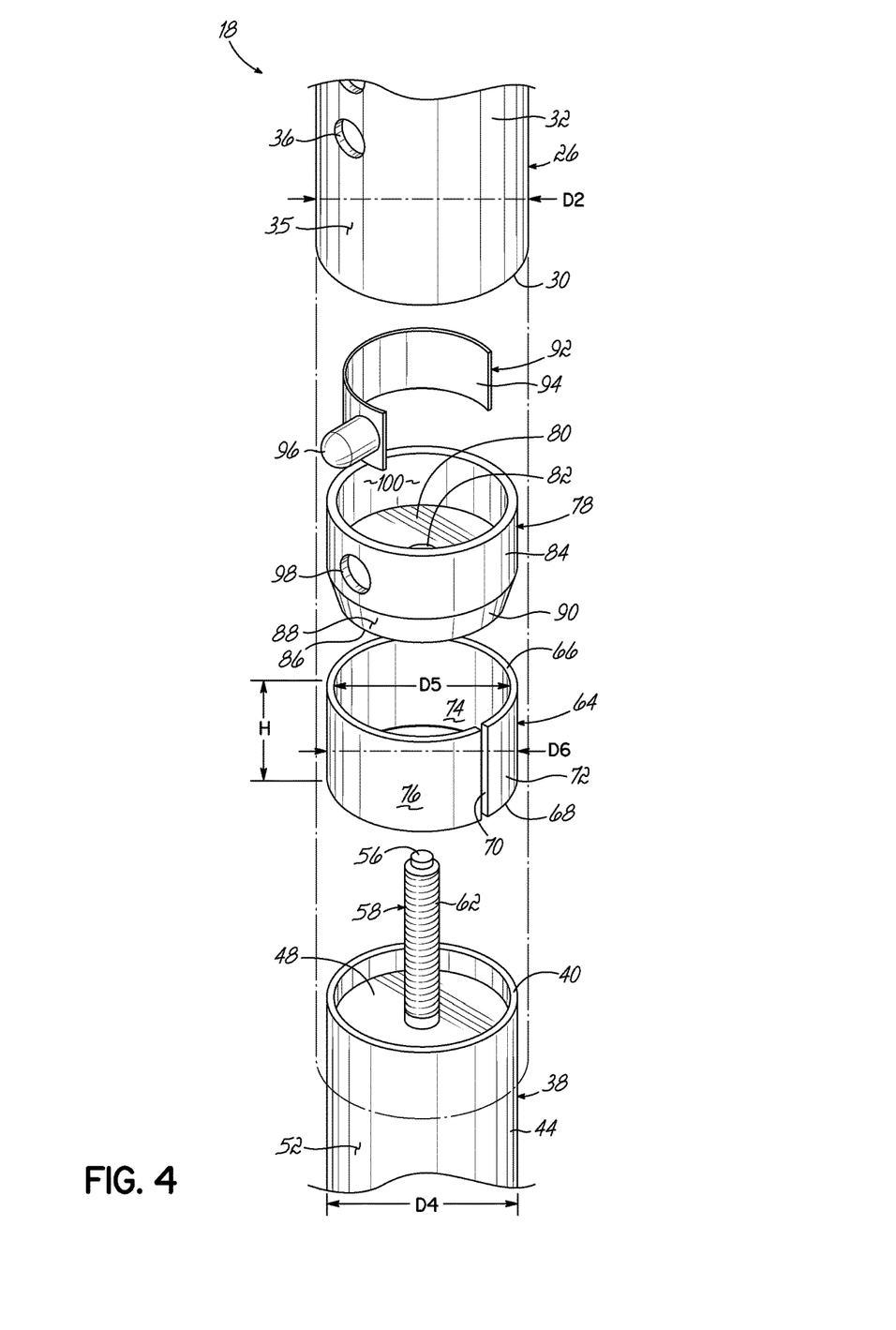
FIG. 4 is a partially disassembled view of a portion of one of the leg assemblies of FIG. 2.
Figure 5A:
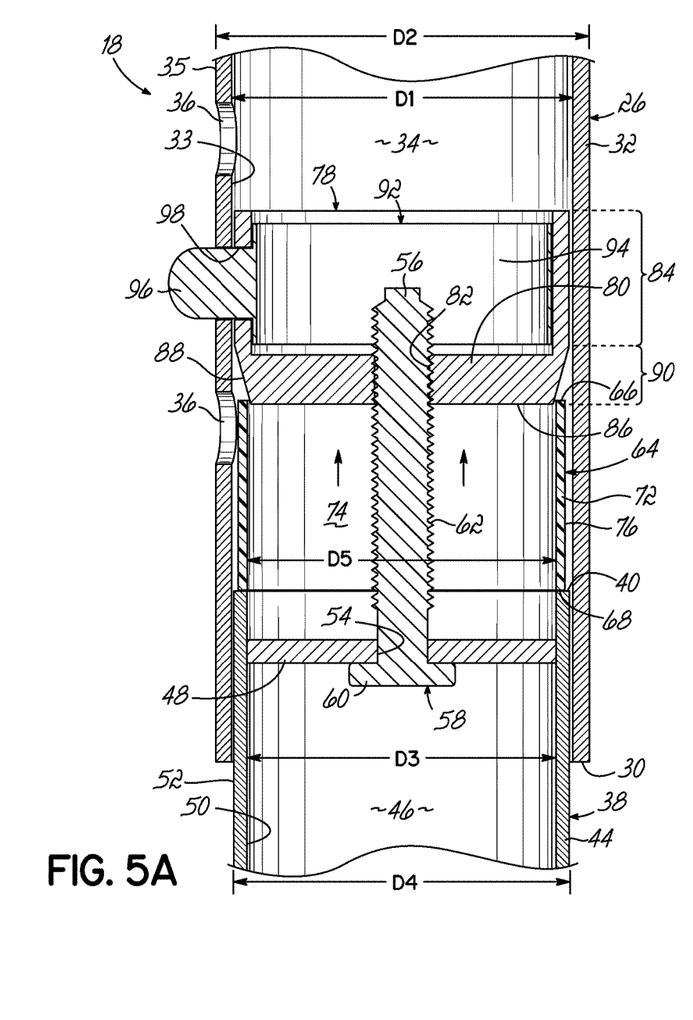
FIG. 5A is a cross-sectional view taken along the line 5A-5A of FIG. 3.
Figure 5B:
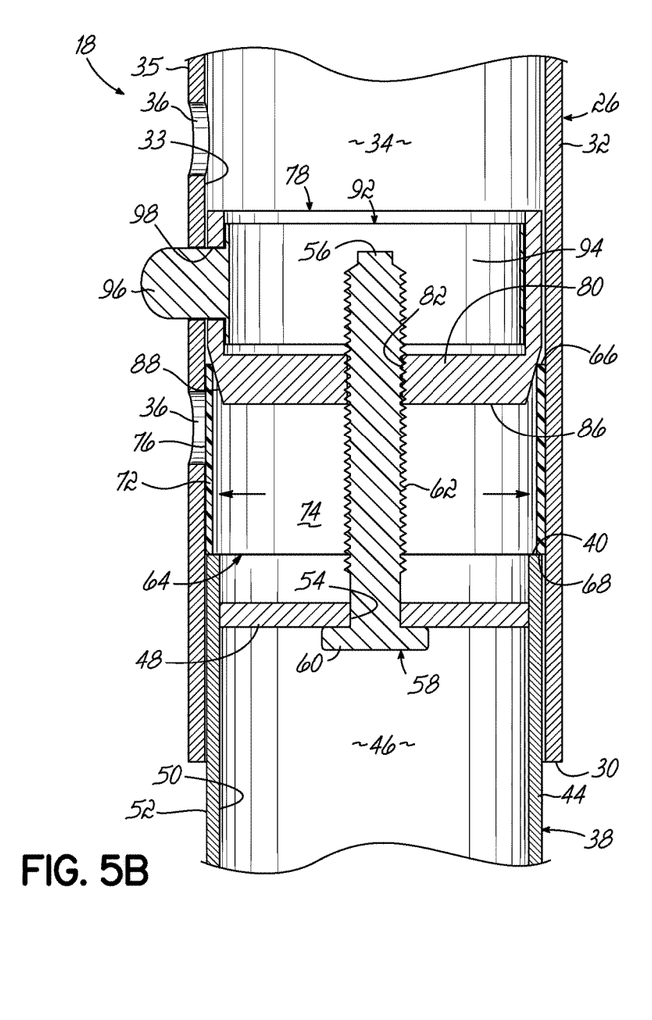
FIG. 5B is a cross-sectional view showing the leg assembly being tightened to prevent wobble or instability.

As best shown in FIG. 3, each leg assembly 18 has an adjustable length L. Each leg assembly 18 includes a stationary receiver 26 and a rotatable leg 38 which functions to stabilize the leg assembly 18 regardless of its length or height. As best shown in FIGS. 3 and 4, each leg assembly 18 comprises a receiver 26 welded or otherwise secured to one of the side members 24, and one of the head and foot members 22, 20, respectively, of generally rectangular metal frame 16. As best shown in FIG. 3, the receiver 26 has an upper edge 28, which is welded or otherwise secured to the generally rectangular metal frame 16, and a lower edge 30. As best shown in FIGS. 5A and 5B, receiver 26 comprises a wall 32 having an interior surface 33 defining a hollow interior 34 therein and an exterior surface 35. As shown in FIGS. 4, 5A and 5B, receiver 26 has an inner diameter D1 and an outer diameter D2. Thus, the receiver 26 has a generally cylindrical shape. As best shown in FIG. 3, receiver 26 has seven aligned holes 36, each hole 36 extending through the wall 32 of the receiver 26. Although seven aligned holes 36 are illustrated, the receiver 26 may have any desired number of holes or openings of any desired shape.

Figure 4A:
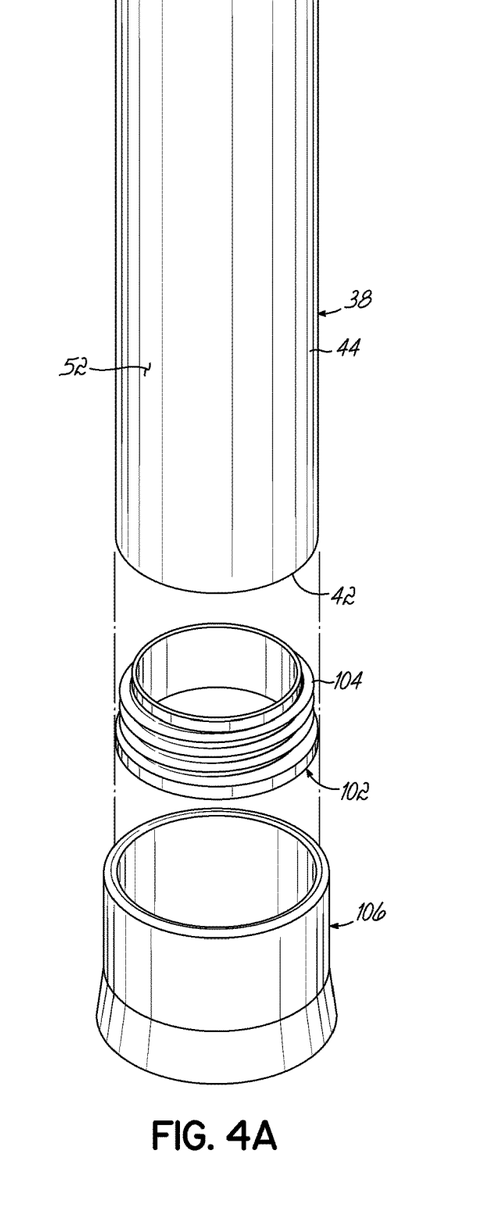
FIG. 4A is a partially disassembled view of another portion of the leg assembly of FIG. 4.

Each leg assembly 18 further comprises a rotatable leg 38 having an upper edge 40, as best shown in FIG. 4, and a lower edge 42, as best shown in FIG. 4A. As best shown in FIGS. 5A and 5B, rotatable leg 38 comprises a wall 44 having an interior surface 50 defining a hollow interior 46 therein and an exterior surface 52. As shown in FIGS. 4, 5A and 5B, rotatable leg 38 has an inner diameter D3 and an outer diameter D4. Thus, the rotatable leg 38 has a generally cylindrical shape.

As best shown in FIG. 4, at an upper portion of the rotatable leg 38, a washer 48 is secured inside the hollow interior 46 of the rotatable leg 38 via welding, for example. As best shown in FIGS. 5A and 5B, washer 48 has a central opening 54 therein through which passes a shaft 56 of a fastener 58. The fastener 58 has a head 60 below the opening 54 of washer 48. See FIGS. 5A and 5B. The shaft 56 of fastener 58 has external threads 62, the function of which is described below.

As best shown in FIG. 4, each leg assembly 18 further comprises a slotted collar 64 having an upper edge 66 and a lower edge 68 defining a height H of the slotted collar 64. The slotted collar 64 has a longitudinally extending linear slot 70 extending the full height H of the slotted collar 64 from the upper edge 66 to the lower edge 68 of the slotted collar 64. As best shown in FIGS. 4, 5A and 5B, slotted collar 64 has a wall 72 having an interior surface 74 defining a uniform inner diameter D5 and an exterior surface 76 defining a uniform outer diameter D6.

As best shown in FIG. 5A, when the rotatable leg 38 is not tightened and the slotted collar 64 is in a lowered position, the inner diameter D5 of the slotted collar 64 is identical to the inner diameter D3 of the rotatable leg 38. As best shown in FIG. 5B, when the rotatable leg 38 is tightened and the slotted collar 64 is in a raised position, the inner diameter D5 of the slotted collar 64 is larger than the inner diameter D3 of the rotatable leg 38. Regardless of the tightness of the leg assembly 18, the lower edge 68 of the slotted collar 64 abuts the upper edge 40 of the rotatable leg 38. Compare FIGS. 5A and 5B.

As best shown in FIG. 4, each leg assembly 18 further comprises a generally cup-shaped wedge 78 having a lower portion 90 and an upper portion 84. The upper portion 84 of wedge 78 has a uniform inner and outer diameter. An opening 98 extends through the upper portion 84 of wedge 78. The upper and lower portions 84, 90 of wedge 78 define a hollow interior 100 of the wedge 78.

As best shown in FIGS. 4, 5A and 5B, the lower portion 90 of wedge 78 includes a bottom 80 having a threaded opening 82 therethrough. The lower portion 90 of wedge 78 has a non-uniform outer diameter which tapers inwardly towards the lower surface 86 of wedge 78. As best shown in FIGS. 5A and 5B, the outer surface 88 of the lower portion 90 of the wedge 78 tapers inwardly, resulting in a smaller and smaller outer diameter, as one travels downwardly along the outer surface 88 of the lower portion 90 of wedge 78.

Although one configuration of the lower portion of wedge having a tapered outer diameter is illustrated, the invention is not intended to be limited by the drawings. The wedge may have a lower portion with a different non-uniform outer diameter, which functions to expand the slotted collar 64 when the rotatable leg 38 is tightened and the slotted collar 64 raised, as described herein.

As best shown in FIG. 4, each leg assembly 18 further comprises a push pin assembly 92, including a generally C-shaped spring 94 having a push pin 96 welded or secured to one end of the generally C-shaped spring 94. As best shown in FIGS. 5A and 5B, the generally C-shaped spring 94 resides inside the hollow interior 100 of wedge 78, the push pin 96 of push pin assembly 92 extending through the opening 98 in the upper portion 84 of wedge 78. When the leg assembly 18 is fixed at a desired height, the push pin 96 of push pin assembly 92 also extends through one of the holes 36 of receiver 26. The leg assembly 18 stays at its desired height when the adjustable bed is in use. Because the push pin 96 of push pin assembly 92 extends through both the opening 98 in the upper portion 84 of wedge 78 and through one of the holes 36 of receiver 26, the wedge 78 is fixed relative to the receiver 26. The wedge 78 does not move when the rotatable leg 38 is being rotated for tightening or loosening purposes. The wedge 78 only moves when an operator loosens the rotatable leg 38 and pushes in the push pin 96 and then moves the push pin 96 so the push pin 96 extends through a different hole 36 of receiver 26.

As shown in FIGS. 5A and 5B, the shaft 56 of fastener 58 extends through the threaded hole 82 in the bottom 80 of wedge 78. The threads 62 of shaft 56 of fastener 58 engage the threads of threaded hole 82 in the bottom 80 of wedge 78 so that upon rotation of the rotatable leg 38 and fastener 58, the rotatable leg 38 raises or lowers relative to the fixed/stationary wedge 78. FIG. 5A illustrates the leg assembly 18 in a loosened position, the exterior surface 76 of the slotted collar 64 not contacting the interior surface 33 of the receiver wall 32. FIG. 5B illustrates the leg assembly 18 in a tightened position, the exterior surface 76 of the slotted collar 64 contacting the interior surface 33 of the receiver wall 32.

To tighten the leg assembly 18, the upper edge 40 of rotatable leg 38 raises upwardly when the rotatable leg 38 is rotated a certain direction, pushing the lower edge 68 of slotted collar 64 upwardly. As the slotted collar 64 is pushed upwardly, its upper portion surrounding the lower portion 90 of wedge 78 is expanded due to the non-uniform or tapered outer diameter of the lower portion 90 of wedge 78 until the exterior surface 76 of slotted collar 64 contacts the interior surface 33 of receiver wall 32. Such contact stabilizes the leg assembly 18 and prevents wobble or movement of leg assembly 18, especially when the leg assembly 18 is fixed at a relatively high position.

To loosen the leg assembly 18 for purposes of adjusting the length of leg assembly 18, an operator rotates the leg in an opposite direction, causing the upper edge 40 of rotatable leg 38 to lower, allowing the lower edge 68 of slotted collar 64 to move downwardly. As the slotted collar 64 moves downwardly, its upper portion surrounding the lower portion 90 of wedge 78 moves downwardly due to the non-uniform or tapered outer diameter of the lower portion 90 of wedge 78 until the exterior surface 76 of slotted collar 64 no longer contacts the interior surface 33 of receiver 26. Such lack of contact loosens the leg assembly 18 and allows the wedge 78 of leg assembly 18 to be moved to another height by an operator pushing the push pin 96 inwardly through the opening 36 in the receiver 26.

As best shown in FIG. 4A, each leg assembly 18 further comprises an end cap 102 having ribs 104 along its exterior surface. The ribs 104 secure the end cap 102 inside the hollow interior 46 of the rotatable leg 38 at the bottom thereof. Lastly, each leg assembly 18 further comprises a rubber foot 106 surrounding a lower portion of the wall 44 of the rotatable leg 38.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. Departures may therefore be made from such details without departing from the spirit or scope of the general inventive concept. The invention resides in each individual feature described herein, alone, and in all combinations of any and all of those features. Accordingly, the scope of the invention shall be limited only by the following claims and their equivalents.

What is claimed is:

1. A leg assembly for use in a bedding product, the leg assembly comprising:
a receiver secured to a frame of the adjustable bed, the receiver having multiple holes;
a leg having a threaded member;
a slotted collar having the same outer diameter as the leg and being supported by the leg;
a wedge having a lower portion including a bottom with a threaded hole and an upper portion with an opening, the lower portion of the wedge having a tapered outer diameter;
a push pin assembly inside the upper portion of the wedge, the push pin assembly including a push pin extending through the opening in the upper portion of the wedge and through one of the holes in the receiver to fix the location of the wedge relative to the receiver; and
the threaded member of the leg extending through the threaded hole in the bottom of the wedge such that upon rotation of the leg, the threaded member of the leg causes an upper edge of the leg to push the slotted collar upwardly over the bottom of the wedge causing the slotted collar to expand outwardly against an inside surface of the receiver to stabilize the leg assembly.

2. The leg assembly of claim 1, further comprising a foot placed over one end of the leg.

3. The leg assembly of claim 1, further comprising an end cap secured inside one end of the leg.

4. The leg assembly of claim 1, wherein the push pin assembly includes a generally C-shaped spring in addition to the push pin.

5. The leg assembly of claim 1, wherein the wedge is made of steel.

6. The leg assembly of claim 1, wherein the wedge is made of plastic.

7. The leg assembly of claim 1, wherein the end cap has external ribs.

8. A leg assembly for use in a bedding product, the leg assembly comprising:
a receiver secured to a frame of the adjustable bed, the receiver having aligned holes;
a leg having a threaded member;
a wedge having a lower portion including a bottom with a threaded hole and an upper portion with an opening, the lower portion of the wedge having a tapered outer diameter, the threaded member of the leg extending through the threaded hole in the bottom of the wedge; and
a push pin assembly inside the upper portion of the wedge, the push pin assembly extending through the opening in the upper portion of the wedge and through one of the holes in the receiver to fix the location of the wedge relative to the receiver; and
a slotted collar sandwiched between the leg and the wedge, wherein upon rotation of the leg, the leg moves upwardly relative to the fixed position of the wedge, an upper edge of the leg pushing the slotted collar upwardly over the bottom of the wedge causing the slotted collar to expand outwardly against an inside surface of the receiver to stabilize the leg assembly.

9. The leg assembly of claim 8, further comprising an end cap secured inside the leg.

10. The leg assembly of claim 9, wherein the end cap has external ribs which secure the end cap inside the leg.

11. The leg assembly of claim 8, wherein the push pin assembly includes a generally C-shaped spring and a push pin, the push pin being secured to one end of the C-shaped spring.

12. The leg assembly of claim 8, further comprising a foot secured to the leg.

13. The leg assembly of claim 8, wherein the wedge is generally cup-shaped.

14. The leg assembly of claim 8, wherein the leg has a generally hollow interior.

15. The leg assembly of claim 8, wherein the wedge is made of steel.

16. A leg assembly for use in an adjustable bed, the leg assembly comprising:
- a receiver welded to a frame of the adjustable bed, the receiver having a hollow interior and aligned holes extending through a wall of the receiver;
- a leg adapted to move between positions inside the hollow interior of the receiver, the leg having a threaded member;
- a wedge having a bottom with a threaded hole adapted to receive the threaded member of the leg, an upper portion with an opening and a lower portion having a non-uniform outer diameter, the threaded member of the leg extending through the threaded hole in the bottom of the wedge;
- a push pin assembly inside the upper portion of the wedge, the push pin assembly extending through the opening in the upper portion of the wedge and through one of the holes of the receiver to fix the location of the wedge relative to the receiver; and
- a slotted collar sandwiched between the leg and the wedge, the slotted collar having a lower edge contacting an upper edge of the leg, a portion of the slotted collar fitting around the lower portion of the wedge and being expandable to contact an inside surface of the receiver to stabilize the leg assembly upon upwardly movement of the leg relative to the wedge due to rotation of the leg.

17. The leg assembly of claim 16, further comprising an end cap secured inside one end of the leg.

18. The leg assembly of claim 16, wherein the push pin assembly includes a generally C-shaped spring and the push pin being secured to one end of the C-shaped spring.

19. The leg assembly of claim 16, further comprising a foot secured to one end of the leg.

20. The leg assembly of claim 16, wherein the wedge is generally cup-shaped.

\* \* \* \* \*